United States Patent
Breithaupt

(10) Patent No.: US 7,377,685 B2
(45) Date of Patent: May 27, 2008

(54) APPARATUS AND PROCESS FOR MIXING AT LEAST TWO FLUIDS

(75) Inventor: Hartmut Breithaupt, Schwabisch-Hall (DE)

(73) Assignee: Endress + Hauser Flowtec AG, Kagenstrasse 7, Reinach (CH)

( * ) Notice: Subject to any disclaimer, the term of this patent is extended or adjusted under 35 U.S.C. 154(b) by 118 days.

(21) Appl. No.: 10/633,599

(22) Filed: Aug. 5, 2003

(65) Prior Publication Data

US 2004/0141409 A1    Jul. 22, 2004

(30) Foreign Application Priority Data

Aug. 21, 2002   (DE) ................. 102 39 189

(51) Int. Cl.
   *B01F 15/04*   (2006.01)
(52) U.S. Cl. ................. 366/152.2; 366/152.3; 366/160.1
(58) Field of Classification Search ........... 366/151.1, 366/152.1, 152.3, 152.4, 162.1, 153.2, 152.2, 366/160.1
   See application file for complete search history.

(56) References Cited

U.S. PATENT DOCUMENTS

| | | | | |
|---|---|---|---|---|
| 3,877,682 A | * | 4/1975 | Moss ................... | 366/152.2 |
| 4,262,686 A | | 4/1981 | Heim et al. | |
| 4,277,254 A | * | 7/1981 | Hanson ................ | 48/189.1 |
| 4,420,008 A | * | 12/1983 | Shu ...................... | 137/4 |
| 4,433,917 A | * | 2/1984 | Mendel et al. ......... | 366/152.2 |
| 4,938,256 A | | 7/1990 | Wiegleb et al. | |
| 5,288,145 A | * | 2/1994 | Mackey et al. ......... | 366/152.2 |
| 5,332,311 A | * | 7/1994 | Volk et al. ............. | 366/152.2 |
| 5,482,368 A | * | 1/1996 | Nakamura et al. ..... | 366/152.2 |
| 6,224,778 B1 | * | 5/2001 | Peltzer ................. | 366/152.1 |
| 6,923,568 B2 | * | 8/2005 | Wilmer et al. ......... | 366/162.1 |
| 2003/0198125 A1 | * | 10/2003 | Linsen et al. .......... | 366/152.1 |
| 2004/0141409 A1 | * | 7/2004 | Breithaupt ............. | 366/152.2 |

FOREIGN PATENT DOCUMENTS

| | | |
|---|---|---|
| DE | 23 34 239 C3 | 1/1982 |
| DE | 689 07 516 T2 | 2/1994 |
| DE | 695 22 240 T2 | 11/2001 |
| DE | 100 30 775 C 1 | 12/2001 |
| DE | 10030775 | 12/2001 |
| DE | 100 48 513 A1 | 4/2002 |

(Continued)

*Primary Examiner*—Charles E. Cooley
(74) *Attorney, Agent, or Firm*—Bacon & Thhomas, PLLC

(57) ABSTRACT

The apparatus comprises a first fluid line for conducting an intermittently flowing first fluid and a second fluid line for conducting an intermittently flowing second fluid, the two fluid lines being connected at a junction to a third fluid line, which forwards the two, particularly mixed, fluids. Further, the apparatus comprises a first flow adjuster, inserted in the first fluid line for setting a volumetric or mass flow rate of the first fluid, and a second flow adjuster, inserted in the second fluid line for setting a volumetric or mass flow rate of the second fluid, as well as means for generating a first control signal, representing an instantaneous setting value for the first flow adjuster, and a second control signal, representing an instantaneous setting value for the second flow adjuster. To produce the fluid mixture, the first fluid and the second fluid are made to flow into the third fluid line alternately. The invention is particularly suited for mixing fluids having different viscosities.

31 Claims, 2 Drawing Sheets

FOREIGN PATENT DOCUMENTS

| | | | |
|---|---|---|---|
| JP | 52-87889 | * | 7/1977 |
| JP | 62-129135 | * | 6/1987 |
| JP | 64-47434 | * | 2/1989 |
| JP | 7-198554 | * | 8/1995 |
| JP | 2000-250634 | * | 9/2000 |
| WO | WO 01/93997 A1 | | 12/2001 |
| WO | 2004/094053 A1 | * | 11/2004 |

* cited by examiner

APPARATUS AND PROCESS FOR MIXING AT LEAST TWO FLUIDS

FIELD OF THE INVENTION

This invention relates to an apparatus and a process for mixing at least two fluids, particularly fluids having differing viscosities.

BACKGROUND OF THE INVENTION

For the industrial production of fluid mixtures, such as beverages or suspensions, consisting of two or more fluid components, a first and a second fluid are often made to flow from two separate fluid lines conducting the two fluids separately into a fluid line forwarding the two fluids together.

The mixing ratio of such a fluid mixture of predeterminable mass or predeterminable volume to be produced by mixing a first fluid, held in a first fluid line, and a second fluid, held in a second fluid line, is commonly set with the aid of a ratio control system. A process implementing such ratio control commonly comprises the steps of:

causing the first fluid to flow into a third fluid line, connected at least intermittently to the first fluid line, in accordance with a predeterminable set point for a volumetric or mass flow rate of the first fluid;

causing the second fluid to flow into the third fluid line, which is also at least intermittently connected to the second fluid line;

measuring the volumetric or mass flow rate of the first fluid and generating a first measurement signal, which represents the measured flow rate of the first fluid;

measuring a totalized volumetric or mass flow rate of the first fluid and generating a first measured flow rate value, which represents the totalized flow rate of the first fluid; and determining an instantaneous set point for a totalized volumetric or mass flow rate of the second fluid based on the set point for a volumetric or mass flow rate of the first fluid and/or on the first measured flow rate value.

SUMMARY OF THE INVENTION

Investigations have shown that with the aforementioned ratio control, sedimentation effects may occur to an increased extent, i.e., that the two fluids mix only very insufficiently or not at all, particularly if the fluids differ widely in their viscosities.

Another problem that may arise with the prior-art ratio control is that in case of a change in reference input, i.e., in the set point for the flow rate of the first fluid, in case of changes in fluid properties, particularly in viscosity, or in case of short-time variations in the volumetric or mass flow rates, the mixing ratio cannot be adjusted with sufficient accuracy. In addition, a design of this ratio control system as an adaptive control system can be implemented only inadequately or only with a very large amount of technical complexity.

An object of the invention is to provide a robust mixture control, particularly a control easily adaptable during operation, by means of which a high-quality fluid mixture can be produced in a simple manner.

To attain the object, the invention provides an apparatus for mixing at least two fluids, particularly fluids having differing viscosities, the apparatus comprising a first fluid line for conducting an intermittently flowing first fluid and a second fluid line for conducting an intermittently flowing second fluid, the first and second fluid lines being connected at a junction to a third fluid line, which forwards the two, particularly mixed, fluids. The apparatus further comprises a first flow adjuster, inserted in the first fluid line for setting a volumetric or mass flow rate of the first fluid, and a second flow adjuster, inserted in the second fluid line for setting a volumetric or mass flow rate of the second fluid, as well as means for generating a first control signal, representing an instantaneous setting value for the first flow adjuster, and a second control signal, representing an instantaneous setting value for the second flow adjuster.

Furthermore, the invention provides a process for producing a fluid mixture of predeterminable mass and/or predeterminable volume by mixing a first fluid, held in a first fluid line, and a second fluid, held in a second fluid line, the process comprising the steps of causing the first fluid to flow into a third fluid line, which is at least intermittently connected to the first fluid line, and causing the second fluid to flow into the third fluid line, which is also at least intermittently connected to the second fluid line.

According to a first variant of the apparatus in accordance with the present invention, the flow adjusters are so controlled by means of the control signals that the two fluids flow alternately into the third fluid line, particularly such that at least upstream of the third fluid line, each of the two fluids flows in a pulsating manner.

According to a second variant of the apparatus in accordance with the present invention, the apparatus further comprises a first flowmeter, inserted in the first fluid line for measuring a volumetric flow rate and/or a mass flow rate of the first fluid and for generating at least a first measurement signal, representing the measured flow rate of the first fluid, and a second flowmeter, inserted in the second fluid line for measuring a volumetric flow rate and/or a mass flow rate of the second fluid and for generating at least a second measurement signal, representing the measured flow rate of the second fluid, the first flowmeter measuring at least intermittently a totalized volumetric or totalized mass flow rate of the first fluid and generating a, particularly digital, first measured flow rate value, which represents the totalized flow rate of the first fluid, as well as a first flow controller, which, using the first measurement signal, generates a first control signal, representing an instantaneous setting value for the first flow adjuster, and a second flow controller, which, using the second measurement signal, generates a second control signal, representing an instantaneous setting value for the second flow adjuster, the first and second flow controllers being interconnected by at least one measurement data line, and the second flow controller generating the second control signal for the second flow adjuster by also using the first measured flow rate value, which is transmitted over the measurement data line.

In a first embodiment of the second variant of the apparatus in accordance with the present invention, the second meter at least intermittently measures a totalized volumetric mass flow rate of the second fluid and generates a, particularly digital, second measured flow rate value, representing the totalized flow rate of the second fluid.

In a second embodiment of the second variant of the apparatus in accordance with the present invention, the first flow controller generates the first control signal for the first flow adjuster by also using the second measured flow rate value, which is transmitted over the measurement data line.

In a third embodiment of the second variant of the apparatus in accordance with the present invention, the, particularly pulsating, flows of the first fluid and/or the second fluid are discontinuous.

In a fourth embodiment of the second variant of the apparatus in accordance with the present invention, the flow rates of the first fluid and/or the second fluid are set to a value other than zero in timed sequence.

In a fifth embodiment of the second variant of the apparatus in accordance with the present invention, the flow rates of the first and second fluids are alternately set to a value other than zero.

In a sixth embodiment of the second variant of the apparatus in accordance with the present invention, the first flow controller at least intermittently receives a, particularly digital, reference input signal representing an instantaneous setting value for the flow rate of the first fluid.

According to a first variant of the process in accordance with the present invention, the steps of causing the first and second fluids to flow into the third fluid line are performed alternately and are repeated several times.

According to a second variant of the process in accordance with the present invention, the process further comprises the steps of measuring a volumetric or mass flow rate of the first fluid and generating a first measurement signal, which represents the measured flow rate of the first fluid, measuring a totalized volumetric or mass flow rate of the first fluid and generating a measured flow rate value, which represents the totalized flow rate of the first fluid, determining an instantaneous set point for a totalized volumetric or mass flow rate of the second fluid, and causing the second fluid to flow into the third fluid line at least until the totalized volumetric or mass flow rate of the second fluid reaches the set point.

In a first embodiment of the second variant of the process in accordance with the present invention, the process further comprises the step of measuring a volumetric or mass flow rat of the second fluid and generating a second measurement signal, which represents the measured flow rate of the second fluid.

In a second embodiment of the second variant of the process in accordance with the present invention, the steps of causing the first and second fluids to flow into the third fluid line are performed alternately.

In a third embodiment of the second variant of the process in accordance with the present invention, the steps for reaching a predeterminable amount for the fluid mixture are repeated at least once, but particularly several times.

One advantage of the invention consists in the fact that high-quality mixtures with very precisely set mixing ratios can be produced in a relatively simple manner. In addition, hitherto used static or dynamic mixers can be largely dispensed with, since the invention reduces the effect of the rheological properties, particularly of the viscosity, of the fluids to be mixed on the sluggishness of the mixing process. Advantageous applications of the invention are, for example, in food processing and in the pharmaceutical or chemical industry.

BRIEF DESCRIPTION OF THE DRAWINGS

The apparatus and the method of the invention as well as further advantages will become more apparent from the following description of embodiments, taken in conjunction with the accompanying drawings, in which.

DETAILED DESCRIPTION OF EXEMPLARY EMBODIMENTS

Figure 2:
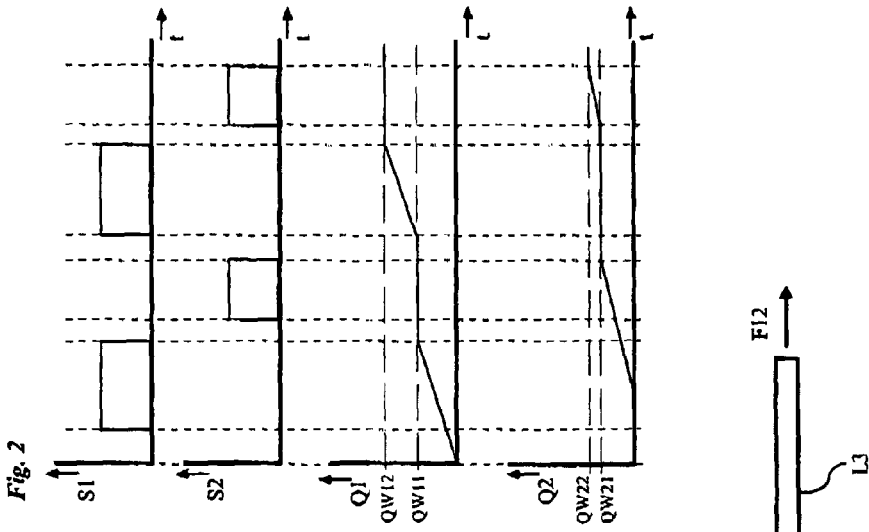
FIG. 2 is a schematic timing diagram illustrating the sequence of steps in the process according to the present invention.

While the invention is susceptible to various modifications and alternative forms, exemplary embodiments thereof have been shown by way of example in the drawings and will herein be described in detail. It should be understood, however, that there is no intent to limit the invention to the the particular forms diclosed, but on the contrary, the intention is to cover all modifications, equivalents, and alternatives falling within the spirit and scope of the invention as defined by the intended claims.

Figure 1:
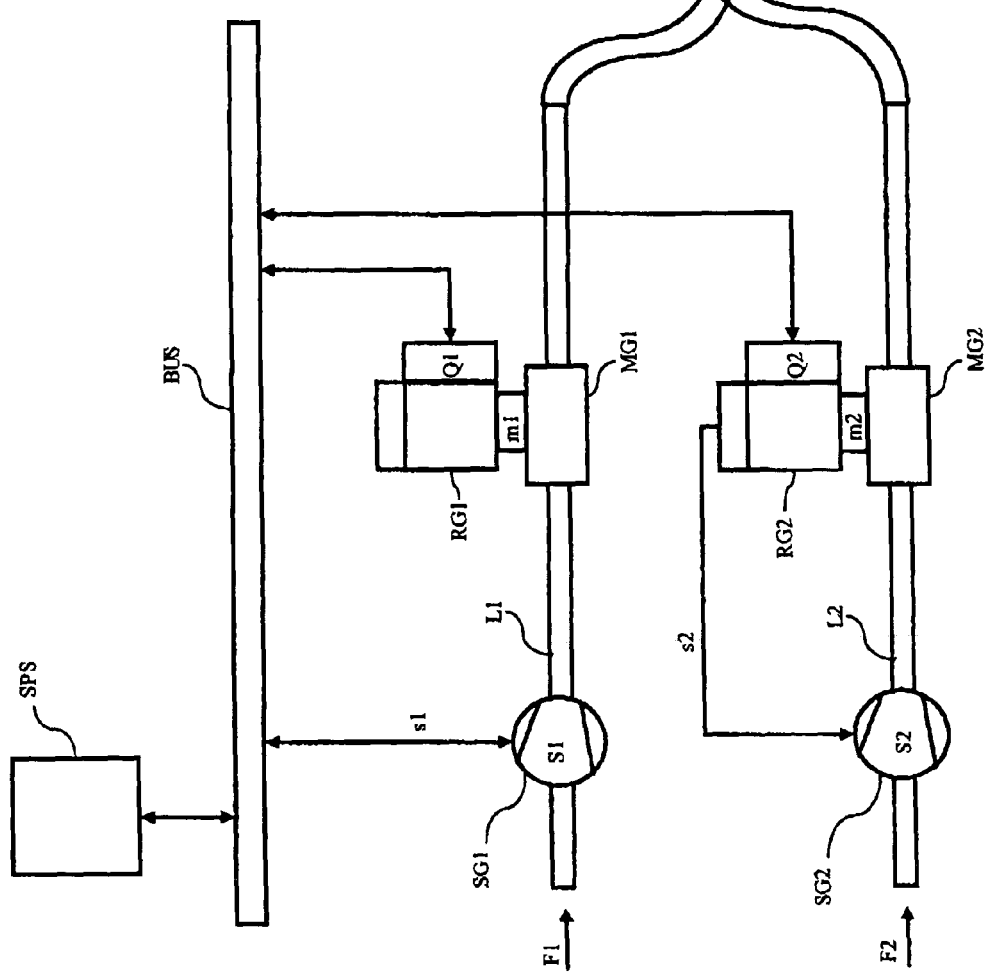
FIG. 1 schematically shows one embodiment of the apparatus according to the present invention.

FIG. 1 schematically shows one embodiment of an apparatus according to the invention which is designed to produce a fluid mixture F12, consisting of at least a first fluid F1 and a second fluid F2, in a predeterminable mixing ratio F1:F2. The predetermined mixing ratio may be stored, for example, in a stored-program controller SPS communicating with the apparatus via a fieldbus BUS; if necessary, it can also be varied in this controller.

The apparatus comprises a first fluid line L1 for conducting the first fluid F1 and a second fluid line L2 for conducting the second fluid F2. At a junction, the two fluid lines are connected with one another and with a forwarding, third fluid line L3.

To produce the fluid mixture F12, according to the invention, the fluid F1 is first caused to flow through fluid line L1 into fluid line L3, with a predeterminable volumetric or mass flow rate of fluid F1 being set by means of a first flow adjuster SG1, which is inserted in fluid line L1. After a predeterminable quantity of fluid F1 has flowed, the flow of fluid F1 is set to zero by means of flow adjuster SG1, and fluid F2 is subsequently caused to flow through fluid line L2 into fluid line L3. A predeterminable volumetric or mass flow rate of fluid F2 is set in analogous fashion by means of a second flow adjuster SG2, which is inserted in fluid line L2. The flow adjusters SG1, SG2 may be, for example, electrically controllable pumps, preferably piston or gear pumps, or electrically operated valves.

To set the volumetric or mass flow rate of fluid F1, in one embodiment of the invention, in addition to the first flow adjuster SG1, a first flowmeter MG1 is inserted in fluid line L1. It serves to measure the flow rate actually set for fluid F1 and to produce a first measurement signal m1, which represents the measured flow rate of fluid F1. The measurement signal m1 is fed to a first flow controller RG1, which, using this measurement signal m1 and a predeterminable set point for the volumetric or mass flow rate of fluid F1, generates a first control signal S1, which represents an instantaneous setting value S1 for flow adjuster SG1. A variation of this setting value S1 with time is schematically shown in FIG. 2.

Flow adjuster MG1 and flow controller RG1 may advantageously be housed in a single case, if necessary in a case of modular construction, forming a first functional unit, as shown schematically in FIG. 1; they may also be arranged in the apparatus separately, of course, in which case an electric connection must be provided between them.

In one embodiment of the invention, flowmeter MG1 is a Coriolis mass flowmeter. In another embodiment of the invention, a Coriolis mass flowmeter/densimeter, which additionally measures the density of the fluid in fluid line L1, or a Coriolis mass flowmeter/densimeter/viscometer, which additionally measures the viscosity of the fluid in fluid line L1, is used as flowmeter MG1.

In another embodiment of the invention, the first functional unit, formed by flowmeter MG1 and flow controller RG1, totalizes the measured volumetric or mass flow rate of fluid F1, i.e., it integrates the flow rate over a predeterminable time interval, to generate a first measured flow rate value Q1, representing the totalized flow rate of fluid F1. In flow controller RG1, the measured flow rate value Q1, which is also generated by means of flowmeter MG1, for example, is repeatedly compared with a predetermined set point QW11 for the totalized volumetric or mass flow rate. Based on this comparison, the set point for the volumetric or mass flow rate of fluid F1 is kept at a value other than zero until the measured flow rate value Q1 has reached or exceeded its associated set point QW11, see FIG. 2.

In a further embodiment of the invention, after the set point QW11 has been reached, a first set point QW21 for a totalized volumetric or mass flow rate yet to be determined for the fluid F2 is generated on the basis of the predetermined mixing ratio F1:F2 and the currently measured flow rate value Q1.

To generate a second measured flow rate value Q2, representing the totalized flow rate of fluid F2, and compare the same with the set point QW21, in a further embodiment of the invention, the apparatus comprises a second flowmeter MG2, inserted in fluid line L2, and a second flow controller RG2, which is coupled, e.g. directly or via a fieldbus, to the second flowmeter MG2. Flowmeter MG2 measures the flow rate actually set for fluid F2 and generates at least a second measurement signal m2, which represents the measured flow rat of fluid F2.

In a further embodiment of the invention, flowmeter MG2, like flowmeter MG1, is a Coriolis mass flowmeter/densimeter, which additionally measures the density of the fluid in fluid line L2, or a Coriolis mass flowmeter/densimeter/viscometer, which additionally measures the viscosity of the fluid in fluid line L2. In yet another embodiment of the invention, flowmeter MG2 is of the same type as flowmeter MG1.

Figure 3:
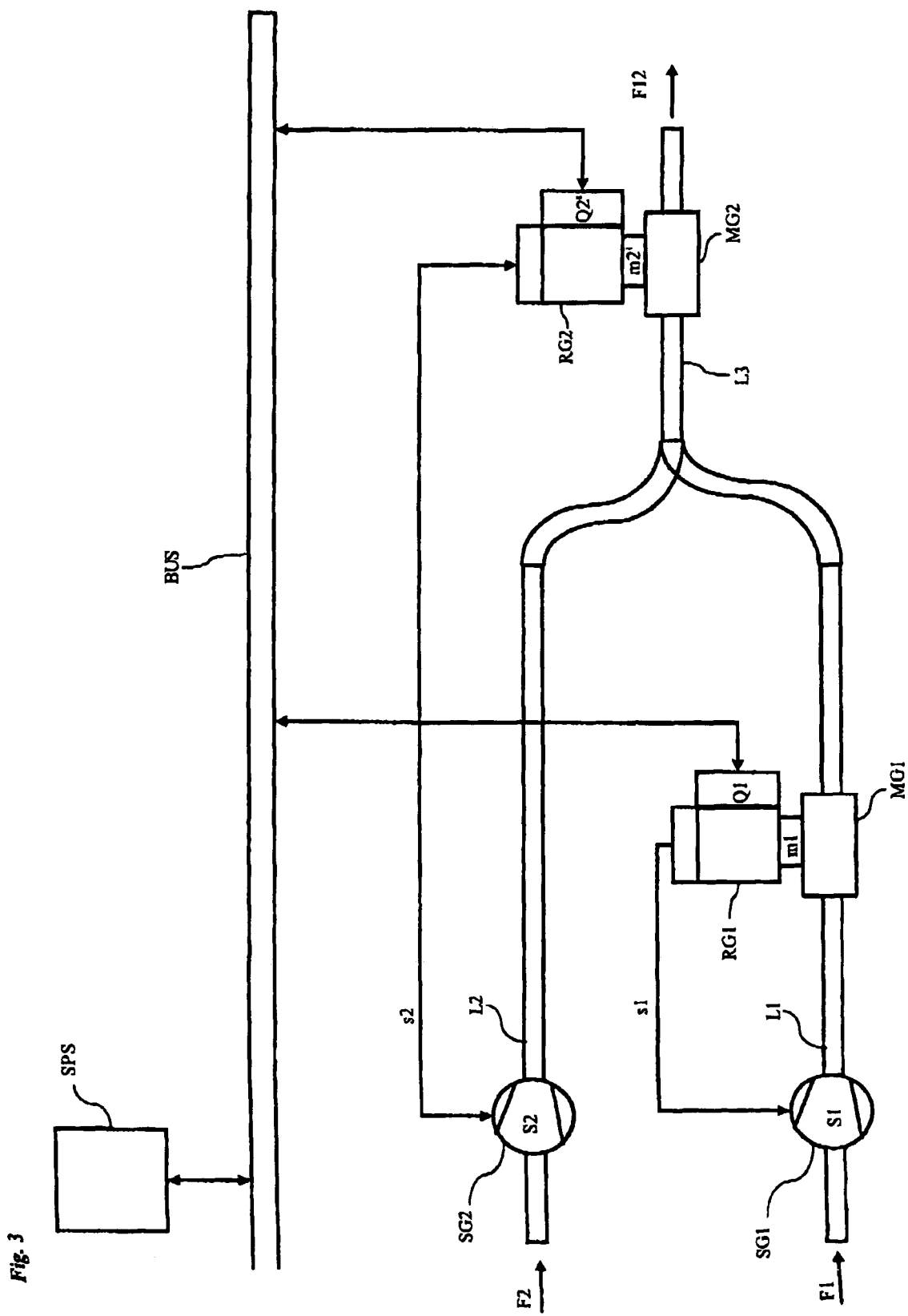
FIG. 3 schematically shows another embodiment of the apparatus according to the present invention.

In another embodiment of the invention, flowmeter MG2, as shown schematically in FIG. 3, is inserted in fluid line L3 to measure a flow rate being adjusted or actually resulting for the fluid mixture F12 and generate at least one measurement signal m2' representing this measured flow rate. Accordingly a total flow rate value Q2' may determined which represents a totalized flow rate of fluid mixture F12. Especially in this embodiment, the use of a multivariable-measuring Coriolis mass flowmeter/densimeter/viscometer for flowmeter MG2 is of particular advantage since such a flowmeter is also suited for determining and monitoring the quality of the fluid mixture F12 directly, particularly immediately after the production of the fluid mixture.

For the exchange of measurement data, particularly for the reception of the set point QW21, the second functional unit, formed by flowmeter MG2 and flow controller RG2, is coupled with the first functional unit, formed by flowmeter MG1 and flow controller RG1, via a measurement data line, which is preferably implemented by means of the fieldbus BUS but may also be a data line directly connecting the two flow controllers RG1, RG2.

By means of the measurement signal m2 and a predeterminable set point for the volumetric or mass flow rate of fluid F2, flow controller RG2 determines an instantaneous setting value S2 for flow adjuster SG2, which it sends to flow adjuster SG2 with the aid of a second control signal s2. In addition, the second functional unit, preferably the flowmeter MG2, totalizes the measured volumetric or mass flow rate of fluid F2 and thus updates the measured flow rate value Q2.

According to the invention, as shown in FIG. 2, the two control signals s1, s2, which are square-wave signals, for example, are so shaped and timed that flow adjusters SG1, SG2 are activated alternately, so that the two fluids F1, F2 flow alternately into the third fluid line L3. As a result, at least upstream of the third fluid line L3, each of the two fluids F1, F2 flows essentially discontinuously, particularly in a pulsating manner.

In a further embodiment of the invention, flow controller RG2 also determines the set point QW21; however, the set point QW21 may also be determined by flow controller RG1 or by the above-mentioned stored-program controller SPS, for example, and communicated to flow controller RG2.

After the measured flow rate value Q2 has at least reached its associated set point QW21, flow controller RG2 causes the flow rate of fluid F2 to be set to zero within as short a time possible, see FIG. 2.

After the set point QW11 and the set point QW21 have been reached, a second set point QW12 for the measured flow rate value Q1 is generated, e.g. by the second functional unit using the measured instantaneous flow rate value Q1, and communicated to flow controller RG1. The set points QW11, Q12 may be so adjusted that the individual partial flow rates of fluid F1 are essentially equal.

Both the set point QW11 and the set point QW12 may also be computed within flow controller RG1 or by means of stored-program controller SPS. For the case where the set points QW11, QW12 are determined by flow controller RG2 or by stored-program controller SPS, flow controller RG1 at least intermittently receives a, preferably digital, reference input signal which transmits the instantaneous set point QW11, QW12 sent by flow controller RG2 or stored-program controller SPS.

The above-described process steps are repeated until the fluid mixture F12 has been produced in a predeterminable quantity, i.e., with a predetermined mass or a predetermined volume, and/or until the mixing ratio has been set with the predetermined accuracy. Accordingly, a second set point QW22 for the measured flow rate value Q2 has to be determined, and a corresponding totalized mass flow rate or volumetric flow rate has to be set by means of the second functional unit; the set points QW21, Q22 may be so adjusted that the individual partial flow rates of the second fluid F2 are essentially equal.

The repeated use of the above-described process steps results in the flow rates of the two fluids F1, F2 being set to a value other than zero in timed sequence, so that the fluids F1, F2 are made to flow only discontinuously, particularly in a pulsating manner. In addition, the flow rates of the fluids are preferably set to a value other than zero only alternately.

Another advantage of the method lies in the fact that the mixing ratio F1:F2 can be set essentially by a ratio of the pulse widths of the two control signals s1, s2. In addition, however, a quality of the fluid mixture F12, for instance a desired high degree of homogeneity of the the two control signals s1, s2. Furthermore, the process in accordance with the present invention is comparatively robust, so that the fluid mixture can also be produced with a consistently high quality. Accordingly, it may suffice for some applications to generate the control signals s1, s2 only as timed pulses, at least for a predeterminable duration, particularly without constantly monitoring the fluid streams in the respective fluid lines L1, L2, L3.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A process for producing a fluid mixture by mixing a first fluid, held in a first fluid line, and a second fluid, held in a second fluid line, said fluid mixture to be conducted within a third fluid line at least intermittently connected to said first fluid line and at least intermittently connected to said second fluid line, said process comprising the steps of:

causing the first fluid to flow into said third fluid line;
   setting the flow of the first fluid in said first fluid line to zero;
   causing the second fluid to flow into said third fluid line,
   setting the flow of the second fluid in said second fluid line to zero; and
   measuring a volumetric or mass flow rate in at least two of the said three fluid lines,
   wherein said steps of causing the first and second fluids to flow into the third fluid line are performed alternately and repeated several times.

2. The process as set forth in claim 1, comprising the further step of measuring a volumetric or mass flow rate in at least one of the three fluid lines.

3. The process as set forth in claim 1, comprising the further step of measuring a fluid density in at least one of the three fluid lines.

4. The process as set forth in claim 1 comprising the further step of measuring a fluid viscosity in at least one of the three fluid lines.

5. The process as claimed in claim 1, further comprising a step of conducting the fluid mixture within said third fluid line.

6. The process as claimed in claim 1, wherein said first and second fluids flow essentially discontinuously in the third line for producing said fluid mixture within the third fluid line.

7. The process as claimed in claim 6, wherein the said first and second fluids flow in a pulsating manner in the third line.

8. The process as claimed in claim 1, further comprising steps of using a first flow adjuster inserted in said first fluid line for setting a flow rate of said first fluid and using a second flow adjuster inserted in said second fluid line for setting a flow rate of said second fluid.

9. The process as claimed in the claim 8, wherein the said first and second fluids flow essentially discontinuously in the third line for producing said fluid mixture within the third fluid line.

10. The process as claimed in the claim 9, wherein the said first and second fluids flow in a pulsating manner in the third line.

11. The process as claimed in claim 1, wherein the first and second fluid lines are connected with said third fluid line at a junction.

12. The process as claimed in claim 1, further comprising steps of: using a first control signal to control a first flow adjuster inserted in said first fluid line, said first flow adjuster setting a flow rate of said first fluid, and using a second control signal to control a second flow adjuster inserted in said second fluid line, said second flow adjuster setting a flow rate of said second fluid.

13. The process as claimed in the claim 12, further comprising a step of controlling a mixing ratio of said fluid mixture by a ratio of pulse widths of said first and second control signals, said mixing ratio representing a relation of said first fluid in the mixture to said second fluid in the mixture.

14. A process for producing a fluid mixture of predeterminable mass and/or predeterminable volume by mixing a first fluid, held in a first fluid line, and a second fluid, held in a second fluid line, said fluid mixture to be conducted in a third fluid line at least intermittently connected to said first fluid line and at least intermittently connected to said second fluid line, the process comprising the steps of:

causing the first fluid to flow into a third fluid line,
   measuring a volumetric or mass flow rate of the first fluid and generating a first measurement signal, which represents the measured flow rate of the first fluid;
   measuring a totalized volumetric or mass flow rate of the first fluid and generating a first measured flow rate value, which represents the totalized flow rate of the first fluid;
   determining, based on said first measured flow rate value, an instantaneous set point for a totalized volumetric or mass flow rate of the second fluid; and
   causing the second fluid to flow into the third fluid line at least until the totalized volumetric or mass flow rate of the second fluid reaches the set point,
   wherein said first and second fluids flow alternately into said third fluid line for producing said fluid mixture within said third fluid line.

15. The process as set forth in claim 14, comprising the further step of measuring a volumetric or mass flow rate of the second fluid and generating a second measurement signal, which represents the measured flow rate of the second fluid.

16. The process as claimed in claim 14, wherein the fluid mixture is conducted in the third fluid line.

17. The process as claimed in claim 16, wherein the said first and second fluids flow essentially discontinuously in the third line for producing said fluid mixture within the third fluid line.

18. The process as claimed in claim 17, wherein the said first and second fluids flow in a pulsating manner in the third line.

19. The process as claimed in claim 14, wherein the fluid mixture is produced from said first and second fluids flowing in the third fluid line.

20. The process as claimed in claim 19, wherein the said first and second fluids flow essentially discontinuously in the third line for producing said fluid mixture within the third fluid line.

21. The process as claimed in claim 20, wherein the said first and second fluids flow in a pulsating manner in the third line.

22. The process as claimed in claim 14, wherein the first and second fluid lines are connected with said third fluid line at a junction.

23. The process as claimed in claim 14, wherein a flow rate of said first fluid is set with a flow adjuster, which is inserted in said first fluid line and which is controlled with a first control signal, and wherein a flow rate of said second fluid is set with a flow adjuster, which is inserted in said second fluid line and which is controlled with a second control signal.

24. The process as claimed in claim 23, further comprising a step of controlling a mixing ratio of said fluid mixture by a ratio of pulse widths of said first and second control signals, said mixing ratio representing a relation of said first fluid in the mixture to said second fluid in the mixture.

25. The process as claimed in claim 14, further comprising a step of measuring a volumetric or mass flow rate of the fluid mixture in the third line.

26. A process for producing a fluid mixture of predeterminable mass and/or predeterminable volume by mixing a first fluid, held in a first fluid line, and a second fluid, held in a second fluid line, said fluid mixture to be conducted in a third fluid line at least intermittently connected to said first fluid line and at least intermittently connected to said second fluid line, said process comprising the steps of:
   causing the first fluid to flow into said third fluid line; setting the flow of the first fluid in the first fluid line to zero; causing the second fluid to flow into the third fluid line;
   setting the flow of the second fluid in the second fluid line to zero; and
   measuring a density of the fluid in at least two of the three fluid lines
   wherein said steps of causing the first and second fluids to flow into the third fluid line are performed alternately and repeated several times.

27. The process as claimed in claim 26, further comprising a step of measuring a viscosity of the fluid in at least one of the three fluid lines.

28. The process as claimed in claim 26, further comprising a step of measuring a volumetric or mass flow rate in at least one of the three fluid lines.

29. A process for producing a fluid mixture of predeterminable mass and/or predeterminable volume by mixing a first fluid, held in a first fluid line, and a second fluid, held in a second fluid line, said fluid mixture to be conducted in a third fluid line at least intermittently connected to said first fluid line and at least intermittently connected to said second fluid line, said process comprising the steps of:
   causing the first fluid to flow into said third fluid line; setting the flow of the
   first fluid in the first fluid line to zero; causing the second fluid to flow into the third fluid line;
   setting the flow of the second fluid in the second fluid line to zero; and
   measuring a viscosity of the fluid in at least two of the three fluid lines
   wherein said steps of causing the first and second fluids to flow into the third fluid line are performed alternately and repeated several times.

30. The process as claimed in claim 29, further comprising a step of measuring a density of the fluid in at least one of the three fluid lines.

31. The process as claimed in claim 29, further comprising a step of measuring a volumetric or mass flow rate in at least one of the three fluid lines.

* * * * *